UNITED STATES PATENT OFFICE 1,982,569

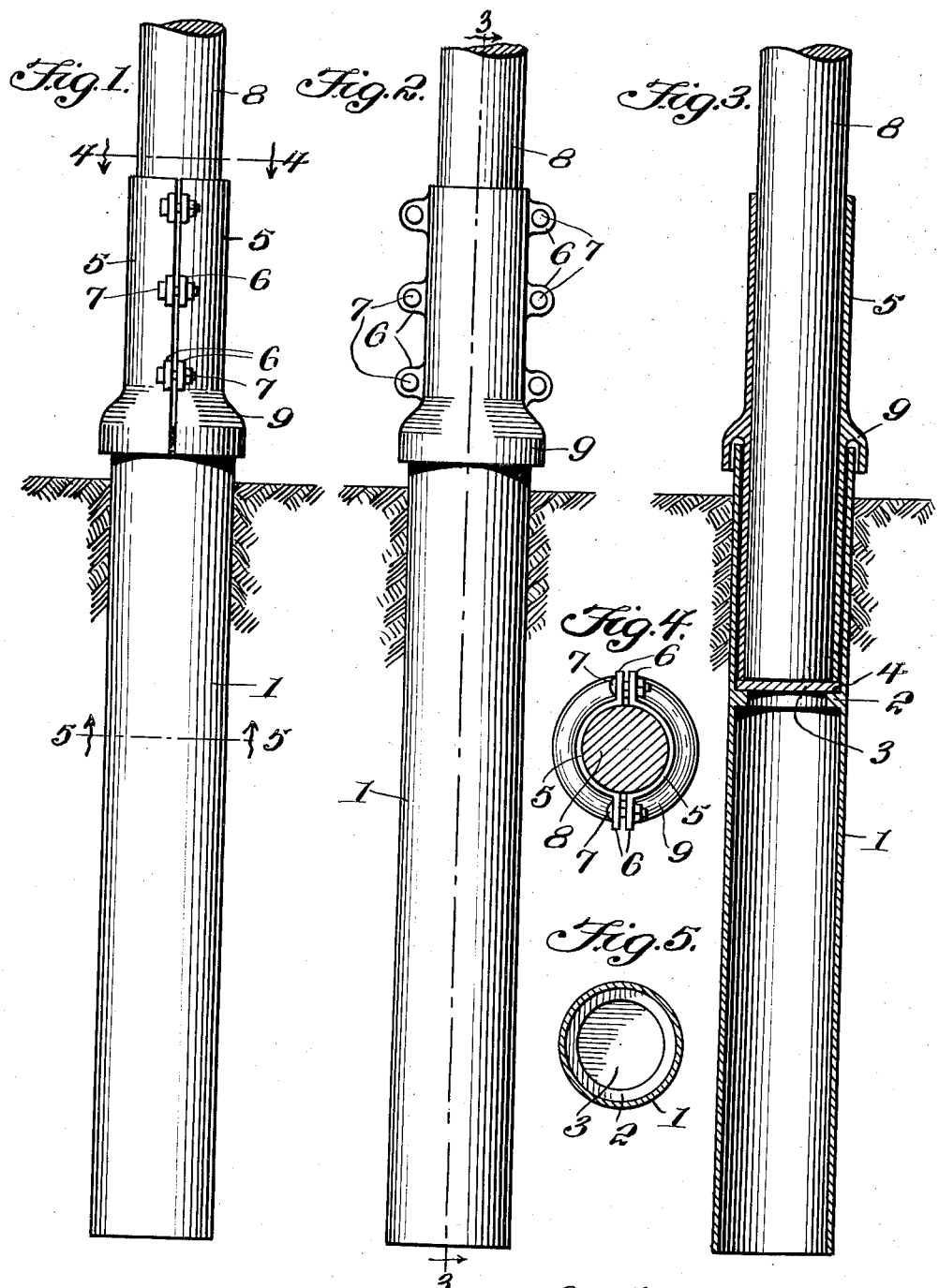

PROTECTIVE DEVICE FOR POLES

Arther J. Byrd, Bessemer, Ala.

Application April 5, 1933, Serial No. 664,627

1 Claim. (Cl. 189—32)

This invention relates to a pole base and has for the primary object, the provision of a device of the above stated character which will efficiently support a pole in the ground and protect said pole against destruction by insects or worms living in the ground and further protect the pole from water or moisture in the ground, thereby retarding deterioration of the pole and further permitting easy and quick removal of the pole from the ground when desired.

Another object of this invention is the provision of a pole base of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a pole base constructed in accordance with my invention.

Figure 2 is a similar view illustrating a side of the device at an angle to that shown in Figure 1.

Figure 3 is a sectional view taken on the line 3—3 of Figure 2.

Figure 4 is a sectional view taken on the line 4—4 of Figure 1.

Figure 5 is a sectional view taken on the line 5—5 of Figure 1.

Referring in detail to the drawing, the numeral 1 indicates a metallic sleeve adapted to be embedded or sunk in the ground as shown in the official drawing, with the upper end thereof projecting a slight distance above the surface of the ground and has formed upon the interior thereof an annular seat 2 on which rests a plate 3 forming a support for the lower end of a pole engaging sleeve 5 constructed from companion sections that have formed thereon apertured ears 6 to receive bolts or like fasteners 7 for securing the sleeve 5 about a pole 8.

A cup-shaped flange 9 is formed integral with the sleeve 5 and is adapted to receive and overlie the upper end of the ground sleeve 1 to provide a water shed to prevent water from entering between said sleeves. It is to be understood that this device is especially designed for supporting wooden poles within the ground to protect them from moisture within the ground and insects or worms living therein. The poles may be of the type for supporting telephone, telegraph lines, or electrical conductor lines or for any other purpose that may be desired.

While I have shown and described the preferred embodiment of my invention, it will be understood that minor changes in construction, combination and arrangement of parts may be made without departing from the spirit and scope of my invention, as claimed.

Having thus described my invention, what I claim is:

A protective device for poles comprising a tubular metallic sleeve having its major portion embedded in the ground with one end thereof projecting a limited distance above the surface of the ground to receive a pole with the latter spaced from the walls thereof, an internal flange formed integral with the sleeve and located closer to the exposed end of the sleeve than the unexposed end of the sleeve, a plate supported by the flange and providing a rest for the pole, a second sleeve surrounding the pole and extending into the first sleeve and engaging the pole, said second sleeve composed of separable sections extending the full length thereof, means detachably and adjustably connecting the sections above the surface of the ground to cause said sections to tightly grip the pole, and a downwardly extending flange formed integrally with and arranged exteriorly of the second sleeve and receiving the exposed end of the first sleeve.

ARTHER J. BYRD.